(12) United States Patent
Woenarta (10) Patent No.: US 11,320,016 B2
(45) Date of Patent: May 3, 2022

(54) VIBRATION DAMPER AND VEHICLE

(71) Applicants: ThyssenKrupp Bilstein GmbH, Ennepetal (DE); thyssenkrupp AG, Essen (DE)

(72) Inventor: Freddy Woenarta, Braunschweig (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 105 days.

(21) Appl. No.: 16/687,799

(22) Filed: Nov. 19, 2019

(65) Prior Publication Data
US 2020/0173514 A1    Jun. 4, 2020

(30) Foreign Application Priority Data
Nov. 29, 2018  (DE) ................ 10 2018 220 628.7

(51) Int. Cl.
*F16F 9/36* (2006.01)
*F16F 9/32* (2006.01)
*B60G 15/07* (2006.01)

(52) U.S. Cl.
CPC ............ *F16F 9/364* (2013.01); *F16F 9/3242* (2013.01); *B60G 15/07* (2013.01); *B60G 2206/41* (2013.01); *F16F 9/363* (2013.01); *F16F 2230/30* (2013.01)

(58) Field of Classification Search
CPC .......... F16F 9/364; F16F 9/365; F16F 9/3242; F16F 9/363; F16F 2230/30; B60G 15/07; B60G 2206/41
See application file for complete search history.

(56) References Cited

U.S. PATENT DOCUMENTS

| | | | | |
|---|---|---|---|---|
| 3,497,199 A | * | 2/1970 | Tuczek .................. | B60G 15/12 267/64.17 |
| 3,958,673 A | * | 5/1976 | Allinquant ............ | B60G 13/08 188/322.14 |
| 3,963,101 A | * | 6/1976 | Stadelmann ............ | A47C 3/30 188/300 |

(Continued)

FOREIGN PATENT DOCUMENTS

| | | |
|---|---|---|
| CN | 201116581 Y | 9/2008 |
| CN | 202790291 U | 3/2013 |

(Continued)

*Primary Examiner* — Robert A. Siconolfi
*Assistant Examiner* — James K Hsiao
(74) *Attorney, Agent, or Firm* — thyssenkrupp North America, LLC (57) ABSTRACT

A vibration damper may include an external tube and at least one internal tube. The external and internal tubes may be disposed in a coaxial manner relative to one another. An annular gap may exist between the external tube and the internal tube, and the annular gap may be fluidically connected to the internal tube. The annular gap may form a compensation chamber for receiving damper oil and damper gas for preloading of the damper oil in the compensation chamber. The vibration damper may further include a separating element disposed in the compensation chamber. The separating element may be axially displaceable and may separate the damper oil from the damper gas in a fluid-tight manner.

15 Claims, 3 Drawing Sheets

(56) References Cited

U.S. PATENT DOCUMENTS

| | | | | |
|---|---|---|---|---|
| 3,993,294 | A | * | 11/1976 | Wossner ................. F16F 9/063 267/64.15 |
| 4,519,481 | A | | 5/1985 | Nicholls |
| 4,653,618 | A | * | 3/1987 | Churchill ............... F16F 9/364 188/269 |
| 4,728,084 | A | * | 3/1988 | Bauer .................... F16F 9/0245 267/64.11 |
| 5,085,412 | A | * | 2/1992 | Peterson ................ B64C 25/60 188/269 |
| 5,246,092 | A | * | 9/1993 | Yamaoka ............... F16F 9/468 188/315 |
| 5,501,438 | A | * | 3/1996 | Handke .................. F16F 9/49 267/221 |
| 5,509,514 | A | * | 4/1996 | Allen ...................... F16F 9/363 188/269 |
| 5,529,155 | A | * | 6/1996 | Jones ..................... F16F 9/364 141/349 |
| 5,848,677 | A | * | 12/1998 | Beck ....................... F16F 9/06 188/322.22 |
| 6,135,434 | A | * | 10/2000 | Marking ................ F16F 9/062 188/315 |
| 6,213,475 | B1 | * | 4/2001 | Schalles ................. F16F 9/067 277/457 |
| 6,311,962 | B1 | * | 11/2001 | Marking ................ B60G 15/14 188/322.17 |
| 6,622,832 | B2 | * | 9/2003 | Ashiba ................... F16F 9/365 188/315 |
| 7,011,193 | B2 | * | 3/2006 | Lemmens ............. F16F 9/3405 188/322.17 |
| 9,533,542 | B2 | * | 1/2017 | Allen ..................... B60G 17/06 |
| 2005/0023093 | A1 | | 2/2005 | Leiphart et al. |
| 2005/0067237 | A1 | | 3/2005 | Schurmans |
| 2017/0037922 | A1 | * | 2/2017 | Takeuchi ................. F16F 9/36 |
| 2019/0017565 | A1 | * | 1/2019 | Lizell ..................... F16F 9/063 |
| 2020/0018375 | A1 | * | 1/2020 | Sogawa ................. F16F 9/064 |

FOREIGN PATENT DOCUMENTS

| | | |
|---|---|---|
| CN | 203477170 U | 3/2014 |
| CN | 104235251 A | 12/2014 |
| CN | 104613124 A | 5/2015 |
| CN | 207315965 U | 5/2018 |
| DE | 1232837 B | 1/1967 |
| DE | 17 75 352 A | 5/1971 |
| DE | 29 42 029 A | 4/1981 |
| DE | 33 02 858 A | 8/1984 |
| DE | 195 31 794 C | 12/1996 |
| DE | 102013204846 A | 9/2014 |

* cited by examiner

VIBRATION DAMPER AND VEHICLE

CROSS REFERENCE TO RELATED APPLICATION

This is a U.S. non-provisional application, which claims priority to German Patent Application No. DE 10 2018 220 628.7, filed Nov. 29, 2018, the entire contents of which are incorporated herein by reference.

FIELD

The present disclosure generally relates to vibration dampers, including vibration dampers with multiple tubes.

BACKGROUND

Vibration dampers are commonly used for motor vehicles and for sports cars and in the industrial sector. In the case of vibration dampers, a distinction is generally made between monotube dampers and multi-tube dampers, twin-tube dampers frequently finding an application as multi-tube dampers. Unlike monotube dampers, twin-tube dampers work with a lower system pressure.

Twin-tube dampers essentially comprise an internal tube and an external tube in the form of a container tube, which are arranged coaxially in relation to one another. In this case a working piston, which divides a working area of the internal tube into an upper and a lower working area, is arranged in an axially displaceable manner in a central internal tube. The working areas in this case are filled with a damper medium, for example, filled with a damper oil. The central internal tube in this case is often designated as a cylindrical tube. The working piston in this case is fixedly connected to a piston rod, by means of which vibrations are introduced into the vibration damper and are damped by it. As the piston rod is forced into the cylindrical tube, the damper oil flows as a result from the lower working area through the working piston into the upper working area, a proportion of the damper oil flowing through a further valve into a compensation chamber because of the additional volume of the immersed piston rod. The compensation chamber is usually configured between the container tube and the internal tube or the cylindrical tube. A damper gas for preloading of the damper oil is introduced into the compensation chamber, the gas being compressed by the damper oil as it is forced in. On the rebound, the damper oil is forced back into the working area of the cylindrical tube by the damper gas.

A vibration damper according to a twin-tube configuration is known, for example, from DE 10 2013 204 846 A1 that is referred to by way of introduction. The vibration damper in this case comprises an external tube and a working cylinder, in which the piston is arranged. A compensation chamber is arranged around the working cylinder coaxially thereto. The compensation chamber comprises a lower oil area and an upper gas area. The oil and the gas in this case communicate in direct contact with one another.

The release of gas bubbles from the gas region is favoured disadvantageously by the direct contact between the oil and the gas. The gas bubbles in this case are absorbed by the oil.

Thus a need exists for improved vibration dampers where fail-safe operation is increased by the separation of the damper media during operation and foaming of the damper oil is prevented.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure is based at least in part on a vibration damper having one external tube and at least one internal tube, which are arranged in a coaxial manner in relation to one another. Configured between the external tube and the internal tube is an annular gap, which forms a compensation chamber for receiving a damper oil and is fluidically connected to the internal tube. A damper gas for preloading of the damper oil is introduced into the compensation chamber, at least one separating element, which is capable of axial displacement and separates the damper oil from the damper gas in a fluid-tight manner, being arranged in the compensation chamber.

The present disclosure has various advantages. Foaming of the damper gas with the damper oil is prevented advantageously by the fluid-tight separation of the damper oil from the damper gas in the compensation chamber. The separating element thus serves for the permanent separation of damper gas and damper oil.

The present disclosure offers the further advantage that rumbling of the vibration damper when cold is prevented by the fluid-tight separation of the damper oil from the damper gas. The inventive vibration damper thus advantageously offers a low noise level in addition to a lower system pressure.

In one example, the separating element is of annular configuration. A constructively simple design of the separating element is advantageous in this case. Furthermore, cost-effective manufacture of the separating element is facilitated as a result.

In another example, the separating element lies against the external tube and/or the internal tube in a fluid-tight manner with at least one sealing lip. This has the advantage that continuous sealing of the damper oil against the damper gas is achieved during operation. The absorption of released vapour bubbles into the damper oil is thus prevented.

In yet another example, the separating element, in each case originating from one front face, comprises tapering of the cross section such that at least one sealing lip edge is configured on the sealing lip. In other words, a sealing lip can be configured in each case on one front face, which comprises at least one sealing lip edge. In this case, a first sealing lip of the separating element is assigned to the damper oil. A second sealing lip is assigned to the damper gas. An improved sealing effect of the separating element is achieved advantageously by the configuration of two sealing lips. The fail-safe operation of the vibration damper is additionally increased. A sealing lip edge of the first sealing lip can lie advantageously against the external tube and/or the internal tube in a fluid-tight manner in this case. In addition, a sealing lip edge of the second sealing lip can lie against the external tube and/or the internal tube in a fluid-tight manner.

The separating element may comprise an outer compression chamber, which is configured radially externally between the separating element and the external tube and is delimited axially by the sealing lips. The separating element can also comprise an inner compression chamber, which is configured radially internally between the separating element and the internal tube and is delimited axially by the sealing lips. An associated advantage is that, in the event of elastic deformation or in the event of compression of the separating element, the material of the separating element is able to yield in the outer and/or inner compression chamber. Damage to the separating element is prevented as a result. In addition, in the case of leakage of a sealing lip, the outer compression chamber and/or the inner compression chamber can advantageously form a barrier, by which penetration of gas bubbles into the damper oil is prevented. The compression chamber can be configured in such a way that the damper oil and/or the damper gas can be received in the compression chamber. The respective compression chamber can be constituted in this case by a material constriction in the separating element. The material constriction in this case essentially forms the tapering of the cross section of the separating element. The respective compression chamber can have a triangular cross-sectional form. The respective compression chamber can also comprise another cross-sectional form. Furthermore, the separating element can also comprise a number of outer and/or inner compression chambers.

The separating element can be of asymmetrical configuration in the axial longitudinal direction. In other words, the sealing lips of the separating element can be configured asymmetrically in relation to one another in the direction of the longitudinal axis of the separating element. The sealing lips thus comprise a mutually divergent cross-sectional form. The longitudinal axis of the separating element corresponds in this case to the rotational axis of the separating element. As a result, it is advantageous for the sealing lips of the separating element to comprise an improved cross-sectional form, which is adapted to the relevant operating conditions. The separating element in this case comprises a double conical form in cross section, wherein a respective cone base forms a front face of the separating element. In addition, the separating element can be of rotationally symmetrical configuration. This facilitates the simple and cost-effective manufacturing of the separating element.

In some examples, the separating element is configured in a single piece. The separating element can be manufactured advantageously, simply and cost-effectively by standardized manufacturing processes, for example by an injection moulding process, an extrusion process or some other manufacturing process.

In some cases, the separating element comprises at least one reinforcing ring, which engages at least partially axially in the separating element. The reinforcing ring can also engage completely axially in the separating element. In other words, the reinforcing ring can also be embedded completely in the separating element. The reinforcing ring can be made of plastic or metal. The reinforcing ring can also be made of rubber or some other elastic material. The reinforcing ring has the advantage that the separating element is protected against uncontrolled deformation at high compression forces. The reinforcing ring therefore serves to provide dimensional stabilization of the separating element in the event of compression forces arising.

The separating element can have at least one reinforcing disc, which is embedded in a front face of the separating element and is terminated flush with the front face of the separating element. It is advantageous in this case that the reinforcing discs reinforce the front faces of the separating element and afford protection against uncontrolled deformation at high compression forces. The reinforcing disc can be formed by a reinforcing element, which has a circular cross section. The reinforcing element can be formed by an O-ring in this case. The reinforcing element can likewise be made of rubber or some other elastic material in this case.

The separating element may in some instances have an elastically deformable configuration. This has the advantage that damage to the separating element is prevented by arising high compression forces.

A further feature of the present disclosure concerns a vehicle having at least one vibration damper of the kind referred to above. In this case, reference is made to the advantages mentioned in conjunction with the vibration damper. In addition, alternatively or additionally, the vehicle can comprise individual characterizing features or a combination of a number of the characterizing features mentioned above in relation to the vibration damper.

Twin-tube dampers generally comprise an internal tube and an external tube in the form of a container tube, which are arranged in a coaxial manner in relation to one another. In this case a working piston, which divides a working area of the internal tube into a first working area and a second working area, is arranged in a central internal tube in an axially displaceable manner. The working areas in this case are filled with a damper medium, for example with a damper oil. The central internal tube in this case is often designated as a cylindrical tube. The working piston in this case is fixedly connected to a piston rod, by means of which vibrations are introduced into the vibration damper and are damped thereby. As the piston rod is forced into the cylindrical tube, the damper oil is caused to flow from the first working area through the working piston into the second working area, a proportion of the damper oil flowing through a further valve into a compensation chamber because of the additional volume of the immersed piston rod. The compensation chamber is usually configured between the container tube and the internal tube or the cylindrical tube. A damper gas for preloading of the damper oil is introduced into the compensation chamber, which is compressed as it is forced through the damper oil. On rebound, the damper oil is forced by the damper gas back into the working area of the cylindrical tube.

Figure 1:
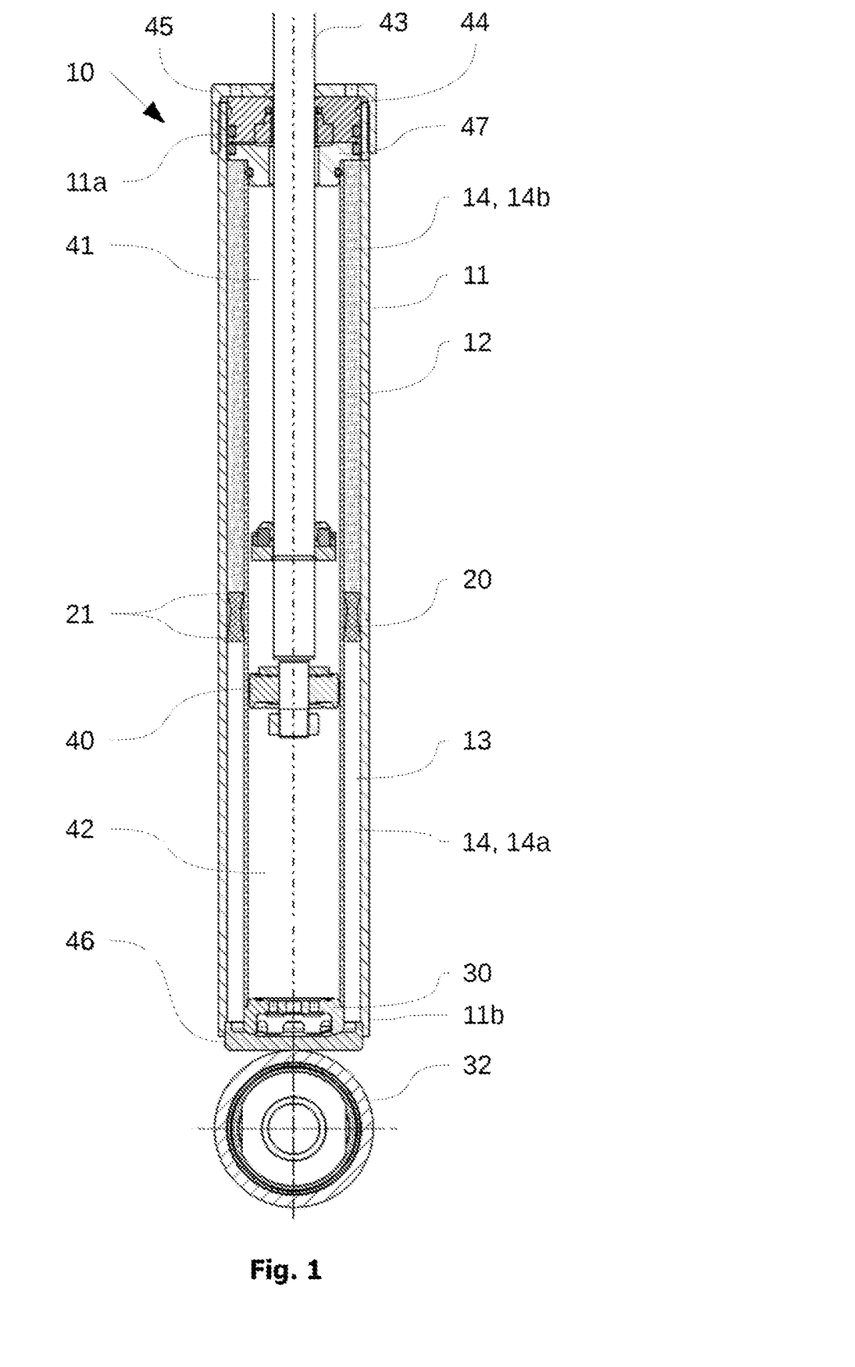
FIG. 1 is a longitudinal sectional view of an example twin-tube vibration damper with a separating element.

FIG. 1 depicts a longitudinal sectional view of a vibration damper 10, in particular a twin-tube damper. The vibration damper 10 is generally referred to as a twin-tube damper in the following description. The separating element 20 in this case can be used for the separation of the damper oil from the damper gas in twin-tube dampers. It is also conceivable for the separating element 20 to find an application in multi-tube dampers which comprise more than two tubes.

The twin-tube damper essentially comprises one external tube 11 and one internal tube 12. The tubes 11, 12 in this case are arranged coaxially in relation to one another. An annular gap 13, which forms a compensation chamber 14 for receiving a damper gas and a damper oil, is configured between the external tube 11 and the internal tube 12.

The twin-tube damper also comprises a working piston 40, by means of which a first working area 41 is fluidically connected to a second working area 42 of the internal tube 12 by means of valves. The working areas 41, 42 in this case are filled with a damper oil. The working piston 40 is arranged in the internal tube 12 in an axially displaceable manner and is connected to a distal end of a piston rod 43. A piston rod guide 44 is arranged on an axial end of the twin-tube damper, furthermore, by means of which the piston rod 43 is guided in the event of an axial movement, in particular during operation. The piston rod guide 44 also comprises seals, which seal the twin-tube damper to the outside in a fluid-tight manner. The piston rod guide 44 lies against a sealing cap 45 with an axially external front face. The piston rod guide 44 lies against a sealing element 47 with an axially internal front face.

The sealing cap 45 forms the axial end of the twin-tube damper, in which the external tube 11 is seated. In other words, the external tube 11 is radially enclosed by the sealing cap 45. The sealing cap 45 in this case can radially enclose the external tube completely or in sections, in particular partially. The external tube 11 is arranged with a first external tube end 11a situated radially between the sealing cap 45 and the piston rod guide 44. The sealing element 47 has a sealing element shoulder, which engages in the internal tube 12. The sealing element 47 further comprises two seals, a first, in particular outer, seal sealing the compensation chamber 14b against the external tube 11 and a second, in particular inner, seal sealing the compensation chamber 14b against the internal tube 12.

The twin-tube damper further comprises a bottom valve 30 and a bottom body 46, which engages in the external tube 11. The bottom body 46 in this case is arranged on a second external tube end 11b of the external tube 11. A fastening device 33 for fastening the twin-tube damper to the motor vehicle is further arranged on the bottom body 46. The bottom body 46 in this case forms a further axial end of the twin-tube damper, which is arranged facing the sealing cap 45 axially. The bottom valve 30 is connected to the internal tube 12. The second working area 42 is fluidically connected to the compensation chamber 14 by the bottom valve 30. A damper gas for preloading of the damper oil is introduced into the compensation chamber 14. A separating element 20 is also arranged in the compensation chamber 14. A number of separating elements 20 can also be arranged in the compensation chamber 14. The separating element 20 is configured so that it encloses the internal tube 12 completely. The separating element 20 can also be configured so that it encloses the internal tube 12 in sections. The separating element 20 divides the compensation chamber 14 into a first compensation chamber 14a and a second compensation chamber 14b. The first compensation chamber 14a in this case forms a damper oil area. The second compensation chamber 14b forms a damper gas area.

The separating element 20 is axially displaceable and separates the damper oil and the damper gas from one another in a fluid-tight manner. As can be clearly appreciated in FIG. 2 to FIG. 4, the separating element 20 comprises two sealing lips 21. According to FIG. 1, the separating element 20 in this case lies against the external tube 11 and the internal tube 12 in a fluid-tight manner respectively with one sealing lip 21. The separating element 20 and the sealing lips 21 are described in greater detail below.

As the damper oil is forced from the second working area 42 of the internal tube 12 into the first compensation chamber 14a during operation, the damper oil presses against the axially displaceable separating element 20 and compresses the damper gas in the second compensation chamber 14b. The release of gas bubbles and damage to valves and further hydraulic components is thus prevented advantageously by the fluid-tight separation of the damper oil from the damper gas. Rumbling when cold is avoided, furthermore, as a result of which a low noise level is achieved during operation of the damper.

Figure 2:
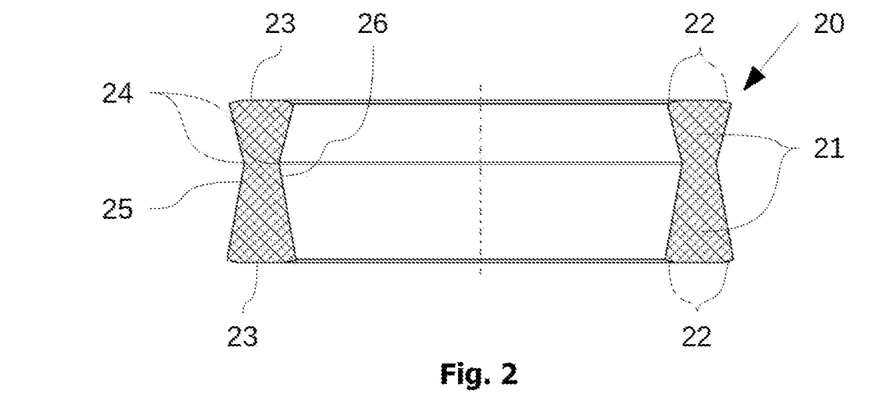
FIG. 2 is a longitudinal sectional view of an example separating element according to FIG. 1.

In FIG. 2, a longitudinal sectional view of a separating element 20 is depicted. The separating element 20 in this case is of annular configuration. As described in FIG. 1, the separating element 20 comprises two sealing lips 21. The sealing lips 23 are configured axially directly opposite one another on the separating element 20. The sealing lips 21 are delimited axially in each case by a front face 23 of the separating element 20. In each case, a front face 23 thus forms a distal end of the separating element 20. The separating element 20 can also comprise a single sealing lip 21. In addition, the separating element 20 can comprise a number of sealing lips 21.

The separating element 20 is configured in a rotationally symmetrical manner. The longitudinal axis of the separating element 20 corresponds to the rotational axis. The separating element 20 comprises tapering of the cross section 24, in each case starting from a front face 23. In this case, two sealing lip edges 22 are configured respectively on one sealing lip 21. The sealing lip 21 can also comprise a single sealing lip edge 22. Furthermore, the sealing lip 21 can also comprise a number of sealing lip edges 22. In the case of twin-tube dampers, the sealing lip edges 22 lie against the external tube 11 and the internal tube 12 in a fluid-tight manner.

The separating element 20 comprises an outer compression chamber 25, which is configured radially externally between the separating element 20 and the external tube 11 and is delimited axially by the sealing lips 21. The outer compression chamber 25 forms an outer free chamber. In the installed condition of the separating element 20 in the vibration damper 10, the outer free chamber is delimited by the sealing lips 21 and the external tube 11. The separating element 20 also has an inner compression chamber 26, which is configured radially internally between the separating element 20 and the internal tube 12 of the twin-tube damper and is delimited axially by the sealing lips 21. The inner compression chamber 26 forms an inner free chamber. In the installed condition in the vibration damper 10, the inner free chamber is delimited by the sealing lips 21 and the internal tube 12.

The separating element 20 can further comprise a number of outer and/or inner compression chambers 25, 26. The respective compression chamber 25, 26 can comprise a triangular cross-sectional form. The respective compression chamber 25, 26 can also comprise another cross-sectional form.

The separating element 20 is configured asymmetrically in the axial longitudinal direction. The separating element 20 can also be configured symmetrically in an axial longitudinal direction. The cross section of the separating element 20 is configured in the form of a double cone. The cross section of the separating element 20 essentially comprises a material constriction. The material constriction is configured in a rotationally symmetrical manner on the internal periphery and on the external periphery of the separating element 20. The material constriction in this case forms the double conical form of the cross section of the separating element 20. The material constriction can also be configured in sections on the separating element 20. The cross section of the separating element 20 can thus also comprise some other form.

The material constriction of the separating element 20 can form the compression chamber 25, 26. In addition, the tapering of the cross section 24 of the separating element 20 can be formed in this case by the material constriction. The compression chambers 25, 26 and/or the tapering of the cross section 24 of the separating element 20 are thus formed by the material constriction.

The separating element 20 can generally be made of an elastic material, such as rubber or plastic, for example. The separating element 20 can also be made of metal. It is also conceivable, furthermore, for the separating element 20 to be formed by combinations of rubber, plastic and metal. The separating element 20 is of elastically deformable configuration. The separating element 20 can also be of rigid, in particular non-deformable, configuration. According to FIG. 2, the separating element 20 is of single-piece configuration. The separating element 20 can also be formed by two or a number of annular separating element sections.

The example of the separating element 20, as well as the arrangement in the vibration damper 10 and the function of the separating element 20, described in FIG. 1 and FIG. 2 corresponds to the example, arrangement, and function of the separating elements 20 depicted below in FIG. 3 and FIG. 5.

Figure 3:
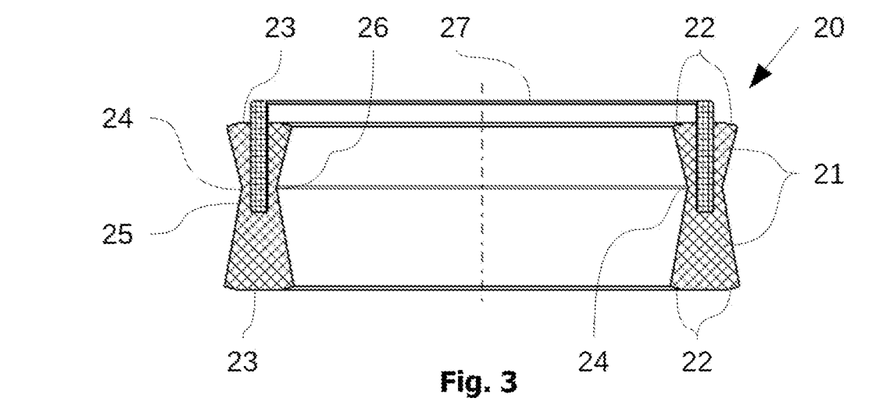
FIG. 3 is a longitudinal sectional view of an example separating element having a reinforcing ring.

FIG. 3 depicts a separating element 20 having a reinforcing ring 27. As can be appreciated in FIG. 3, the reinforcing ring 27 engages axially partially in the separating element 20. The reinforcing ring 27 in this case engages in the separating element 20 in such a way that the reinforcing ring 27 protrudes with an axial end beyond the material constriction in the separating element 20 described in FIG. 2. The reinforcing ring 27 protrudes with a further axial end above one of the two front faces 23 of the separating element 20. In this case, a longitudinal section of the reinforcing ring 27 which engages in the separating element 20, is larger than a longitudinal section of the reinforcing ring 27 which protrudes beyond the front face 23. The reinforcing ring 27 can also be arranged completely in the separating element 20. In other words, the reinforcing ring 27 can be embedded completely in the separating element 20. The reinforcing ring 27 can be made of plastic and/or metal. The reinforcing ring can also be made of rubber or some other elastic material. It is also conceivable for the reinforcing ring 27 to be formed by a combination of the aforementioned materials. The reinforcing ring 27 can also be made of another not specified material.

Figure 4:
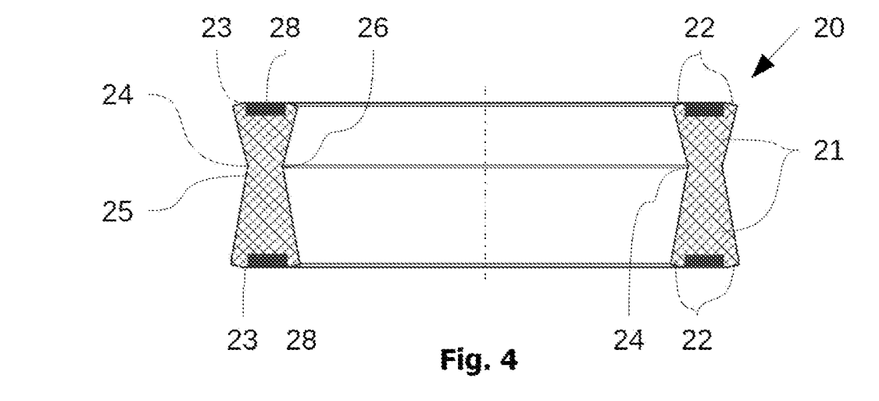
FIG. 4 is a longitudinal sectional view of an example separating element having two reinforcing discs.

A separating element 20 with two reinforcing discs 28 is depicted according to FIG. 4. A respective reinforcing disc 28 is embedded in one of the two front faces 23 of the separating element 20 in each case. The respective reinforcing disc 28 is terminated flush with the front face 23 of the separating element 20. The respective reinforcing disc 28 can also be embedded in the front face 23 protruding above the front face 23. The separating element 20 can also comprise a single reinforcing disc 28. In this case the reinforcing disc 28 is embedded only in one of the two front faces 23. The reinforcing disc 28 in this case can likewise be terminated flush with the front face 23 or protruding above the front face 23 embedded therein. The reinforcing discs 28 can be made of plastic and/or metal. The respective reinforcing disc 28 can also be made of rubber or some other elastic material. It is generally conceivable for the reinforcing disc 28 to be formed by a combination of the aforementioned materials. The reinforcing discs 28 can also be made of another not specified material.

Figure 5:
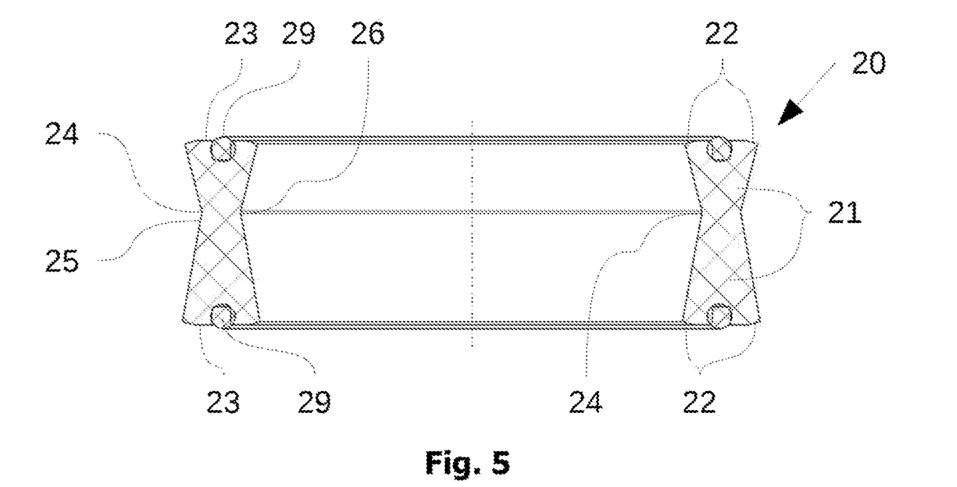
FIG. 5 is a longitudinal sectional view of an example separating element having two reinforcing elements.

FIG. 5 depicts a separating element 20 having two reinforcing elements 29. The reinforcing elements 29 comprise a round, in particular circular, cross section. The reinforcing elements 29 in this case can be formed respectively by an O-ring or an annular spring. The reinforcing elements 29 can also comprise an elliptical cross section. The reinforcing elements 29 can be made of plastic and/or metal. The reinforcing ring can also be made of rubber or some other elastic material.

One reinforcing element 29 is embedded respectively in one of the two front faces 23 of the separating element 20. The respective reinforcing element 29 protrudes above the front face 23 of the separating element 20. The reinforcing element 29 can also be embedded in the front face 23 in such a way that the reinforcing element 29 is terminated flush with the front face. It is also conceivable for the respective reinforcing element 29 to be embedded completely in the associated sealing lip 21. For this purpose, the reinforcing element 29 can be moulded, for example, in the respective sealing lip 21. The separating element 20 can also comprise a single reinforcing element 29. In this case, the reinforcing element 29 is embedded in only one of the two front faces 23.

The reinforcing ring 27, the reinforcing discs 28 and the reinforcing elements 29, as described in FIG. 3, FIG. 4 and FIG. 5, generally serve for the dimensional stabilization of the separating element 20 in the event of compression forces arising during operation of the vibration damper 10. Uncontrolled deformation of and damage to the separating element 20 is prevented as a result.

Figure 6:
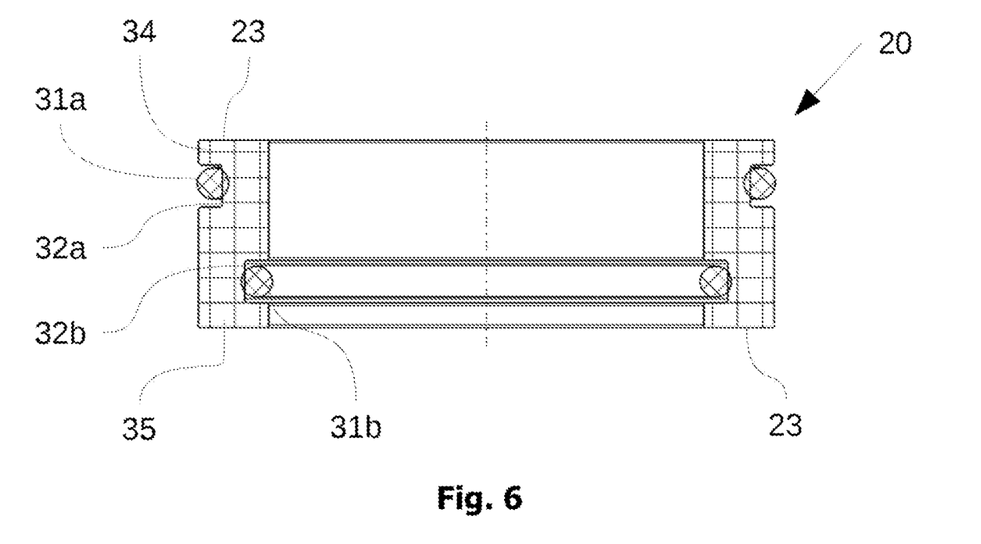
FIG. 6 is a longitudinal sectional view of an example separating element having two sealing elements.

Depicted in FIG. 6 is a separating element 20, which comprises two sealing elements 31a, 31b. The separating element 20 is of annular, in particular hollow cylindrical configuration. According to FIG. 6, the separating element 20 is of single-piece configuration. The cross section of the separating element 20 is thus of S-shaped configuration. The separating element 20 can also be formed by two or a number of annular separating element sections. The separating element 20 is of rotationally symmetrical configuration. The longitudinal axis of the separating element 20 corresponds to the rotational axis.

The separating element 20 can be made of an elastic material, such as rubber or plastic, for example. The separating element 20 can also be made of metal. It is also conceivable, furthermore, for the separating element 20 to be made from combinations of rubber, plastic and metal. The separating element 20 is of elastically deformable configuration. The separating element 20 can also be of rigid, in particular non-deformable, configuration.

The separating element 20 comprises an outer groove 32a and an inner groove 32b. The outer groove 32a is configured radially circumferentially in the separating element 20 on the outside. The outer groove 32a in this case is of open configuration radially to the outside. The outer groove 32a is arranged on a first axial end region 34 of the separating element 20. The outer groove 32a is arranged at a distance to a front face 23 of the first end region 34.

The inner groove 32b is configured radially circumferentially in the separating element 20 on the inside. The inner groove 32b in this case is of open configuration radially inwards. The inner groove 32b is arranged on a second axial end region 35 of the separating element 20. The second end region 35 in this case is arranged axially opposite the first end region 34. The inner groove 32b is arranged at a distance to a front face 23 of the second end region 34.

The sealing elements 31a, 31b form an outer sealing element 31a and an inner sealing element 31b. The sealing elements 31a, 31b are respectively of annular configuration. The sealing elements 31a, 31b comprise a round, in particular circular cross section. The sealing elements 31a, 31b can also comprise an elliptical cross section.

The outer sealing element 31a is arranged laid, in particular embedded in the outer groove 32a. In the installed state of the separating element 20 in the compensation chamber 14 of the vibration damper 10, the outer sealing element 31a forms a fluid-tight connection between the separating element 20 and the external tube 11.

The inner sealing element 31b is arranged laid, in particular embedded in the inner groove 32b. In the installed state of the separating element 20 in the compensation chamber 14 of the vibration damper 10, the inner sealing element 31b forms a fluid-tight connection between the separating element 20 and the internal tube 12.

The separating element 20 according to FIG. 6 is not restricted to the two sealing elements 31a, 31b. It is conceivable for the separating element 20 to comprise more than two sealing elements.

LIST OF REFERENCE DESIGNATIONS 10 vibration damper
11 external tube
11a first external tube end
11b second external tube end
12 internal tube
13 annular gap
14 compensation chamber
14a first compensation chamber
14b second compensation chamber
20 separating element
21 sealing lip
22 sealing lip edge
23 front face of the separating element
24 tapering of the cross section
25 outer compression chamber
26 inner compression chamber
27 reinforcing ring
28 reinforcing disc
29 reinforcing element
31a outer sealing element
31b inner sealing element
30 bottom valve
32a outer groove
32b inner groove
33 fastening device
34 first axial end region
35 second axial end region
40 working piston
41 first working area
42 second working area
43 piston rod
44 piston rod guide
45 sealing cap
46 bottom body
47 sealing element

What is claimed is:

1. A vibration damper comprising:
an external tube;
an internal tube, wherein the external and internal tubes are disposed in a coaxial manner relative to one another, wherein an annular gap between the external tube and the internal tube is fluidically connected to the internal tube, the annular gap forming a compensation chamber for receiving a damper oil and a damper gas for preloading of the damper oil in the compensation chamber; and
a separating element disposed in the compensation chamber, wherein the separating element is axially displaceable and separates the damper oil from the damper gas in a fluid-tight manner, wherein the separating element comprises:
a sealing lip that lies against both the external tube and the internal tube in a fluid-tight manner,
an outer compression chamber that is configured radially externally between a body of the separating element and the external tube and that is delimited axially by the sealing lip, and
an inner compression chamber that is configured radially internally between the body of the separating element and the internal tube and that is delimited axially by the sealing lip.

2. The vibration damper of claim 1 wherein the separating element is of annular configuration.

3. The vibration damper of claim 1 wherein the separating element, which originates from a front face, comprises tapering of a cross section such that a sealing lip edge is configured on the sealing lip.

4. The vibration damper of claim 1 wherein the separating element is configured in a rotationally symmetrical manner.

5. The vibration damper of claim 1 wherein the separating element is configured in a single piece.

6. The vibration damper of claim 1 comprising a reinforcing ring that engages axially at least partially in the separating element.

7. The vibration damper of claim 1 wherein the separating element has a reinforcing disc that is embedded in a front face of the separating element and that terminates flush with the front face.

8. The vibration damper of claim 1 wherein the separating element is elastically deformable.

9. The vibration damper of claim 1 wherein the separating element is solid between the internal tube and the external tube except for the inner and outer compression chambers.

10. A vibration damper comprising:
an external tube disposed along a longitudinal axis;
an internal tube, wherein the external and internal tubes are disposed in a coaxial manner relative to one another, wherein an annular gap between the external tube and the internal tube is fluidically connected to the internal tube, the annular gap forming a compensation chamber for receiving a damper oil and a damper gas for preloading of the damper oil in the compensation chamber;
a separating element disposed in the compensation chamber, wherein the separating element is axially displaceable and separates the damper oil from the damper gas in a fluid-tight manner, wherein between the internal tube and the external tube at least one solid portion of the separating element occupies a radial plane that extends orthogonally in all directions from the longitudinal axis;

a first reinforcing disc that is received in a recess disposed in a first axial end face of the separating element at a radial midpoint between the internal tube and the external tube; and a second reinforcing disc that is received in a recess disposed in a second axial end face of the separating element at a radial midpoint between the internal tube and the external tube.

11. The vibration damper of claim 10 wherein the first axial end face of the separating element is planar and extends from the internal tube to the external tube, wherein the second axial end face of the separating element is planar and extends from the internal tube to the external tube.

12. The vibration damper of claim 10 wherein the separating element is recessed from the internal tube and the external tube at an axial midpoint of the separating element.

13. A vibration damper comprising of:

an external tube disposed along a longitudinal axis;

an internal tube, wherein the external and internal tubes are disposed in a coaxial manner relative to one another, wherein an annular gap between the external tube and the internal tube is fluidically connected to the internal tube, the annular gap forming a compensation chamber for receiving a damper oil and a damper gas for preloading of the damper oil in the compensation chamber;

a separating element disposed in the compensation chamber, wherein the separating element is axially displaceable and separates the damper oil from the damper gas in a fluid-tight manner, wherein between the internal tube and the external tube at least one solid portion of the separating element occupies a radial plane that extends orthogonally in all directions from the longitudinal axis;

a sealing lip that lies against at least one of the external tube or the internal tube in a fluid-tight manner; and at least one of:

an outer compression chamber that is configured radially externally between a body of the separating element and the external tube and that is delimited axially by the sealing lip, or an inner compression chamber that is configured radially internally between the body of the separating element and the internal tube and that is delimited axially by the sealing lip, wherein the at least one of the outer compression chamber or the inner compression chamber is formed by two tapered surfaces of the separating element that are transverse to the longitudinal axis.

14. The vibration damper of claim 13 wherein a first of the two tapered surfaces forms a part of the sealing lip and extends from a portion of the sealing lip that contacts the internal tube or the external tube.

15. The vibration damper of claim 10 comprising a compression chamber formed between a first surface of the separating element, a second surface of the separating element, and either the internal tube or the external tube, wherein the separating element extends longitudinally between a first axial end and a second axial end, wherein the first surface tapers from the first axial end and the second surface tapers from the second axial end to meet at a radially-thinnest portion of the separating element that is located between the first and second axial ends of the separating element, wherein angles formed by tapers of the first and second surfaces are transverse to the longitudinal axis and to a wall of the either the internal tube or the external tube.

* * * * *